United States Patent
Li et al.

(10) Patent No.: US 9,254,537 B2
(45) Date of Patent: Feb. 9, 2016

(54) PLURAL LAYER PUTTY-POWDER/SLURRY APPLICATION METHOD FOR SUPERALLOY COMPONENT CRACK VACUUM FURNACE HEALING

(71) Applicants: Hang Li, Charlotte, NC (US); Mark A. Garcia, Pfafftown, NC (US); Somesh J. Ghunakikar, Orlando, FL (US); William J. Lowe, Pfafftown, NC (US)

(72) Inventors: Hang Li, Charlotte, NC (US); Mark A. Garcia, Pfafftown, NC (US); Somesh J. Ghunakikar, Orlando, FL (US); William J. Lowe, Pfafftown, NC (US)

(73) Assignee: Siemens Energy, Inc., Orlando, FL (US)

( * ) Notice: Subject to any disclaimer, the term of this patent is extended or adjusted under 35 U.S.C. 154(b) by 68 days.

(21) Appl. No.: 14/134,212

(22) Filed: Dec. 19, 2013

(65) Prior Publication Data

US 2015/0174707 A1 Jun. 25, 2015

(51) Int. Cl.
*B05C 13/00* (2006.01)
*B05D 3/02* (2006.01)
*B23P 6/04* (2006.01)
*B23K 1/00* (2006.01)
*B23P 6/00* (2006.01)
*F01D 5/00* (2006.01)

(52) U.S. Cl.
CPC . *B23P 6/045* (2013.01); *B23K 1/00* (2013.01); *B23K 1/0018* (2013.01); *B23P 6/007* (2013.01); *B23P 6/04* (2013.01); *F01D 5/005* (2013.01); *F05D 2230/22* (2013.01); *F05D 2300/175* (2013.01)

(58) Field of Classification Search
CPC .. B05D 3/0254; B05D 3/0263; B05D 3/0272; B05D 5/005
USPC ........ 427/140, 142, 372.2, 375, 376.1, 376.6, 427/376.7, 376.68
See application file for complete search history.

(56) References Cited

U.S. PATENT DOCUMENTS

| | | | |
|---|---|---|---|
| 5,156,321 A | 10/1992 | Liburdi | |
| 6,004,683 A | 12/1999 | Rafferty | |
| 6,283,356 B1 * | 9/2001 | Messelling | 228/119 |
| 8,141,769 B2 * | 3/2012 | Ott et al. | 228/119 |

* cited by examiner

*Primary Examiner* — Dah-Wei D Yuan
*Assistant Examiner* — Nga Leung V Law

(57) ABSTRACT

A process for repairing combined heavy erosion and thermal fatigue cracks and/or other defects, such as large cracks, in a high temperature superalloy component, such as a vane in a turbine section of a gas turbine engine, that does not require mechanical grinding to prepare the defect site. The process includes depositing a loose finely granulated superalloy powder or a low viscosity superalloy slurry in the crack up to a suitable level and then depositing a superalloy putty layer on the superalloy powder or slurry at the top of the crack A braze putty layer is then deposited over the superalloy putty layer and the component is sintered in a vacuum furnace to harden the superalloy putty and powder or slurry to repair the defect.

22 Claims, 3 Drawing Sheets

PLURAL LAYER PUTTY-POWDER/SLURRY APPLICATION METHOD FOR SUPERALLOY COMPONENT CRACK VACUUM FURNACE HEALING

BACKGROUND OF THE INVENTION

1. Field of the Invention

This invention relates generally to a technique for repairing defects in a component made of a high temperature superalloy and, more particularly, to a technique for repairing cracks and/or high temperature oxidation/hot corrosion induced material losses in a vane for a turbine section in a gas turbine engine that includes depositing a superalloy powder or slurry in the cracks and then depositing a superalloy putty layer and a braze putty layer over the powder or slurry.

2. Discussion of the Related Art

The world's energy needs continue to rise which provides a demand for reliable, affordable, efficient and environmentally-compatible power generation. A gas turbine engine is one known machine that provides efficient power, and often has application for an electric generator in a power plant, or engines in an aircraft or a ship. A typically gas turbine engine includes a compressor section, a combustion section and a turbine section. The compressor section provides a compressed air flow to the combustion section where the air is mixed with a fuel, such as natural gas, and ignited to create a hot working gas. The working gas expands through the turbine section where it is directed across rows of blades therein by associated vanes. As the working gas passes through the turbine section, it causes the blades to rotate, which in turn causes a shaft to rotate, thereby providing mechanical work.

Gas turbine engines of this type are periodically serviced for maintenance purposes. One of the maintenance operations is to detect erosion, mechanical fatigue and cracking in various turbine parts including high pressure and low pressure vanes in the turbine section of the engine. The hot working gas paths for the first and second rows of vanes in the turbine section is directly from the combustion section of the engine, which frequently causes erosion of the vanes at various locations and triggers thermal mechanical fatigue cracking. This causes the vanes to be reshaped, thus possibly directing the working gas in a non-optimal direction and could cause catastrophic failure. As the consequences of the erosion and cracking damages of the turbine vanes, engine operation efficiency is reduced and operation safety is jeopardized.

Because turbine vanes are made from either Ni or Co based vacuum investment cast grade superalloys, they are very expensive, and thus it is usually desirable to repair the above described erosion and cracking during turbine service instead of replacing the vane. Known processes in the art to repair erosion and cracks in turbine vanes include high temperature vacuum brazing or sintering and different types of fusion welding. Because fusion welding repair can cause base alloy cracking and component distortion issues, preferred repair technologies are vacuum furnace brazing/sintering technologies Different furnace brazing/sintering technologies have been developed in the art to address defects of different types and sizes. For small size cracks, it is known in the art to employ transient liquid phase (TLP) bonding to repair the cracks. For large size cracks, three different approaches all employing wide gap brazing technologies have been employed in the art. Unlike TLP bonding, which uses an active diffusion braze alloy as a filler material, wide gap brazing or sintering is more complicated. One of the wide gap brazing techniques uses a single mixture of a braze/superalloy powder and organic binder formed as a slurry for large crack repair to reduce the total amount of Si, P or B eutectic phases at the braze layer location. Another wide gap sintering process is known, referred to as pre-sintered preforms (PSP), where braze/alloy mixtures are pre-sintered at certain temperature in a vacuum furnace to form a sheet type of preforms for subsequent component repair usage.

The third type of wide gap brazing technique is very different from the other two methods. Instead of mixing a braze with superalloy powders to form a single mixture filler, the method separately applies a braze material and a superalloy material to construct a two-layer filler structure. In the two-layer repair process, both the braze powder and the superalloy powder are applied in a putty form, where the putty is a mixture of the powder and an organic binder. The layers of the superalloy putty and the braze putty are then sintered in a vacuum furnace that causes the braze material to melt and infiltrate and consolidate the superalloy layer to be hardened. Hardening of the superalloy layer then will be realized through an active element diffusion process. As an extension of the double layer putty/putty method, double layer flexible braze tapes are also made using a similar approach in which more sophisticated organic binders are used for a long shelf life.

The TLP bonding process is typically suitable for repairing cracks with a gap size in the range of 0.05-0.25 mm and the single mixture wide gap repair process can be used to repair cracks with a gap size up to 1.5 mm. However, if the crack gap size is in the 0.3-1.5 mm range, the capillary effect of the crack weakens significantly, where inconsistent braze crack filling, formation of large shrinkage holes and the development of a centerline eutectic phase become difficult issues to overcome. In addition, as the gap size increases, a higher percentage of a brittle eutectic phase with a low re-melt temperature becomes a problem at the braze joint. As a result, TLP and the one mixture wide gap brazing approach are usually considered as cosmetic repairs. The pre-sintered preform method can only be used for a flat surface overlay repair as the PSP sheets are hard and brittle.

Wide gap crack repair techniques using the two-layer repair process have traditionally been preferred for damage sites that are widely open and easily to access. This is because both braze and superalloy powders are inserted into the damage sites in a putty form, where small and deep damage sites present challenges to get the putty within the damage cavities. Typically, it is necessary to open up the small defects through a mechanical grinding operation in order for the two-layer wide gap repair process to be performed where the defect size is increased. The grinding operation also removes component service induced oxides inside the cracks or on the surface of the erosion damage site so as to expose clean base metal for the brazing/sintering operation The process of mechanical grinding converts small cracks into large cavities especially if the cracks are deep so that the superalloy putty filler material can be easily inserted into the opening formed by the grinding process However, the mechanical grinding process adds complexity and cost to the repair operation, and can significantly weakens the integrity of the original cast structure and increases the total amount of braze alloy required for the repairs. Increasing the total amount of braze alloy at the repair site can reduced the potential of any repeat repairs applicable to the same site. The outcomes are higher repair cost and lower repair quality. As hydrogen fluoride cleaning can effectively remove oxides from the damaged site with minimum negative impact to the base alloy, using mechanical blinding to serve solely for oxide removal is considered as an outdated method.

SUMMARY OF THE INVENTION

The following disclosure describes a process for repairing cracks and/or other defects in a high temperature superalloy component, such as a high pressure or lower pressure vane in a turbine section of a gas turbine engine, that does not require mechanical grinding to prepare the defect site. The process includes depositing a loose finely granulated superalloy powder or superalloy slurry in the crack up to a suitable level and then depositing a superalloy putty layer on the superalloy powder or slurry at the top of the crack. A braze putty layer is then deposited over the superalloy putty layer and the component is sintered in a vacuum furnace to harden the superalloy putty and powder or slurry to repair the defect.

Additional features of the present invention will become apparent from the following description and appended claims, taken in conjunction with the accompanying drawings.

DETAILED DESCRIPTION OF THE EMBODIMENTS

Figure 1:
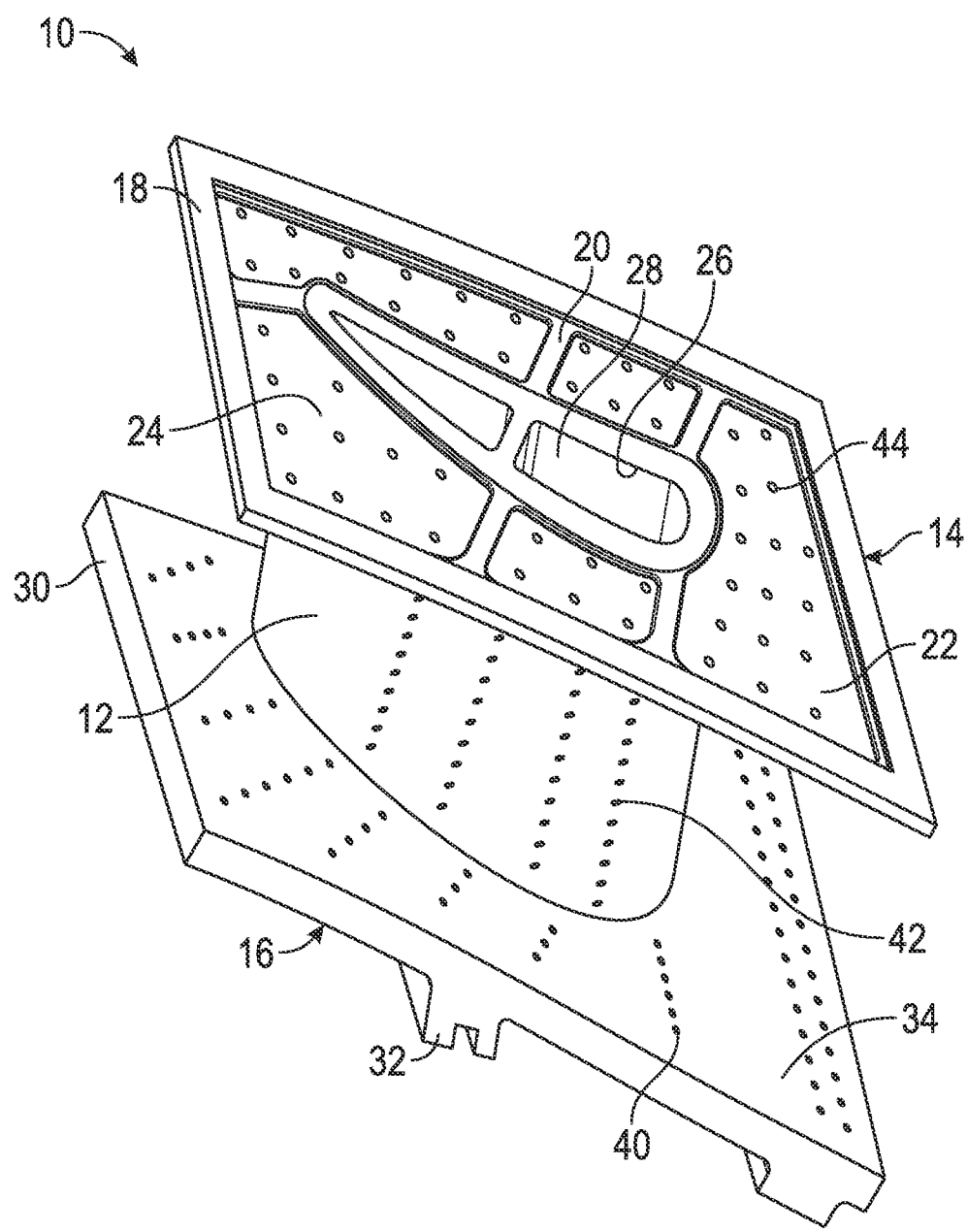
FIG. 1 is an isometric view of a vane assembly for a gas turbine engine.

The following discussion of the embodiments of the invention directed to a technique for repairing erosion and cracking in a high temperature superalloy component is merely exemplary in nature and is in no way intended to limit the invention or its applications or uses. For example, the technique described herein has particular application for repairing a vane in a gas turbine engine. However, as will be appreciated by those skilled in the art, the repair technique may have application for other high temperature components FIG. 1 is an isometric view of a known vane assembly 10 for a known gas turbine engine (not shown) including a vane airfoil 12, an inner diameter (ID) platform 14 mounted to one side of the airfoil 12 and an outer diameter (OD) platform 16 mounted to an opposite side of the air foil 12. The vane assembly 10 is provided by illustration to give context to the description of the invention for repairing a high temperature superalloy component discussed below. The vane assembly 10 is intended to generally represent any vane in a gas turbine engine. A number of the vane assemblies are mounted together, where assembly 10 is mounted through an inner mounting rail 32 of the OD platform 16 to an adjacent vane assembly to define a ring structure that provides one of the rows of the vanes in the engine. The platform 14 includes an outer perimeter rail 18, a plurality of inner partition ribs 20 and a base plate 22 that define a plurality of specially configured impingement compartments 24. An opening 26 in the platform 14 is in communication with an inner chamber 28 within the airfoil 12. The platform 16 also includes an outer perimeter rail 30, the inner mounting rail 32 and a base plate 34 also defining impingement compartments.

A series of specially configured film cooling holes 40 are formed through the base plate 34 of the platform 16, a plurality of specially configured film holes 42 are formed through the vane airfoil 12 and a plurality of specially configured film holes 44 are formed through the base plate 22 of the platform 14. Cooling air from the compressor section of the engine flowing through the chamber in all of the airfoils associated with a particular vane row flows through the film holes 42 and creates a cooling film on an outer surface of the vane airfoil 12. Likewise, cooling flow that enters the impingement compartments 24 in the platform 14 flows through the film holes 44 and provides a cooling film on an outer surface of the base plate 22. Further, air that flows into the impingement compartments of the platform 16 flows through the film holes 40 and creates a cooling film on the surface of the base plate 34.

A typical combined erosion and thermal mechanical fatigue crack damage site formed in the vane of a gas turbine engine will have a wide upper portion as erosion damage and a narrow lower portion damage defining thermal mechanical fatigue cracking. The wide upper portion of the erosion damage may be wide enough to accept the known superalloy putty for the repair process depending on its size. However, the narrow lower portion of the thermal mechanical fatigue crack damage likely will not be wide enough to effectively accept the superalloy putty because of its higher viscosity Thus, often times, the entire crack is not suitably filled with the superalloy putty using the two-layer repair process resulting in a lower integrity fix The present invention proposes using a loose superalloy powder or low viscosity superalloy powder slurry that is not in a putty form, where the powder is the superalloy material having a maximum powder size smaller than what is typical crack gap opening size, and the low viscosity slurry is a fine superalloy powder in combination with an organic binder. The superalloy powder is deposited in the crack so that gravity allows it to fall into the narrowest parts of the cracks that often times would not be filled with the superalloy putty in the known two-layer repair process. Mechanical vibration can be employed to facilitate the loose superalloy powder to more effectively fall within the crack gap so that it is completely filled to increase the pact density of the powder in the crack. For those through type cracks, low viscosity superalloy slurry is used to replace loose superalloy powder to fill the cracks using syringe.

Once the crack is filled with the superalloy powder or superalloy slurry, at least up to a level where the known superalloy putty can fill the remaining crack void, the known superalloy putty is then deposited in the remaining open part of the crack void on top of the powder so that the void is completely filled, where the putty would extend beyond the top surface of the component. Once the superalloy putty is deposited within the crack or other void in the component, a braze putty or braze superalloy putty is deposited on top of the superalloy putty in the traditional manner. The component is then placed in a vacuum furnace where the superalloy powder and superalloy putty are sintered to form a solid superalloy sponge. Particularly, the braze alloy is melted in the vacuum furnace to cause the braze alloy to infiltrate the superalloy sponge and trigger superalloy sponge consolidation, where the superalloy sponge consolidation includes diffusion of the braze alloy to harden and homogenize the superalloy sponge.

The superalloy materials for both the finely granulated superalloy powder, low viscosity superalloy slurry and the superalloy putty can be any suitable cast grade nickel or cobalt based superalloy, such as IN738 MM247, Rene 80, Rene 142, IN100, IN939, X40, Alloy 713, Alloy 731, Rene 125, Rene 41 and MM509. The superalloy materials in loose superalloy powder form, superalloy powder slurry form and the superalloy powder putty form can be of the same alloy or different alloys depending on the particular process and/or repair technical requirements. The braze alloy or braze superalloy mixture can be any suitable commercial or specially designed high temperature nickel or cobalt base braze alloy, or a mixture of braze alloy with a superalloy powder. The braze putty can include a pure braze putty or a braze-superalloy mixture putty with a braze/superalloy mixing ratio range equal or higher than 70/30.

Depositing the superalloy powder or superalloy slurry in the cracks before depositing the superalloy putty provides a number of advantages. Particularly, this repair process is capable of filling small cracks and the narrow bottom portion of large cracks and cracks at the bottom portion of combined erosion/thermal mechanical cracking damage sites with the loose superalloy powder or superalloy slurry through the help of gravity or a syringe, thus eliminating the prerequisite of the mechanical grinding operation required by the putty/putty two-layer repair process. This process also enhances the capillary effect of the brazing operation for cracks with gap sizes larger than 0.2 to 0.3 mm, which otherwise cannot be repaired by other available brazing processes. A tailored composition and mechanical properties of the repair sites is possible if two different types of superalloy materials are employed. Because crack grinding is eliminated, the operation cost is lower and the integrity of the original cast grade superalloy structure of the components is preserved to the maximum extent possible. Because the size of the repair site is reduced, less of the braze alloy is required for each repair resulting in a better possibility of multiple repairs on one component.

Figure 2:
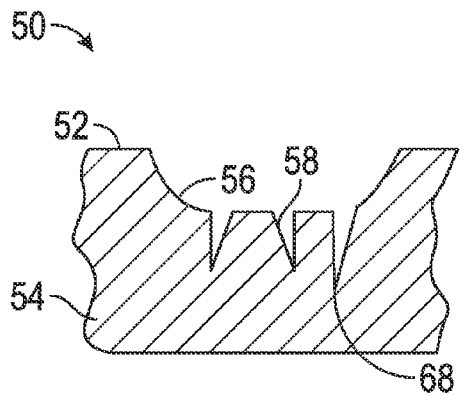
FIG. 2 is a cut-away, cross-sectional view of a high temperature superalloy component having an erosion cavity and thermal mechanical fatigue cracking.

FIG. 2 is a cut-away, cross-sectional view of a portion of a high temperature superalloy component 50, such as a gas turbine engine vane, including a top surface 52 and a body 54 defining the thickness of a wall of the component 50. Although the specific application of the invention described herein is for high temperature superalloy vanes in a gas turbine engine, other high temperature components in the engine, such as some of the blades, or other high temperature components in other devices may be applicable for the invention. Through operation of the gas turbine engine, including high temperature working gas erosion, metal thermal mechanical fatigue cracking, etc., the component 50 may be damaged where an erosion cavity 56 is formed through the top surface 52 of the component 50 into the body 54. This component service condition may also cause thermal mechanical fatigue cracks 58 having end points 68 that extend farther into the body 54, as shown. It is noted that the erosion cavity 50 and the cracks 58 are intended to represent any of the structural defects that may occur in these types of components during operation of the engine.

Figure 3:
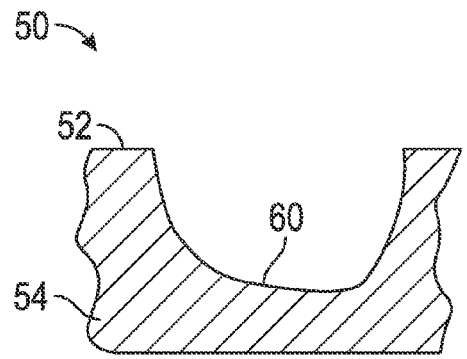
FIG. 3 a cross-sectional view of the component shown in FIG. 2 where the cavity has been prepared for repair by a known mechanical grinding process.

The known two-layer repair process of first depositing a superalloy putty in the defect and then covering the superalloy putty with a braze putty has the drawbacks discussed above because the superalloy putty was often too viscous and not able to get into the lower portion of the cracks 58 all of the way to the points 68. Therefore, it was often necessary to prepare the erosion cavity 56 by mechanically grinding out the cavity 56 to remove the cracks 58 so that the cavity 56 was completely open and was able to more readily accept the superalloy putty. This is illustrated in FIG. 3 where the erosion cavity 56 has been enlarged by grinding to form a cavity 60 that goes to the depth into the body 54 of the lowest point 68 of the cracks 58. Thus, as is apparent, a significant portion of the metal of the body 54 has been removed that was not damaged by erosion or cracking, thus reducing the integrity of the component 50.

Figure 4:
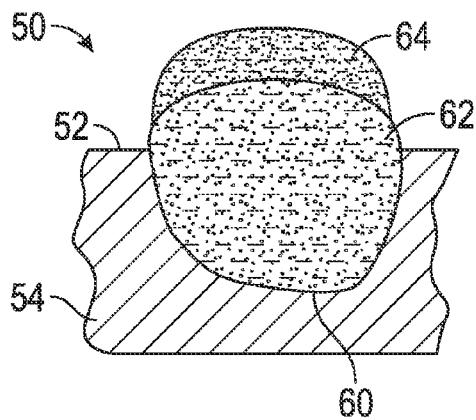
FIG. 4 is a cross-sectional view of the component shown in FIG. 3 where a superalloy putty layer is deposited in the prepared cavity and covered by a braze putty layer.

FIG. 4 shows the component 50 after the cavity 60 has been formed and has been repaired by the two-layer superalloy putty/braze putty repair process. Particularly, the cavity 60 is first filled with a superalloy putty layer 62 with enough volume so that it completely fills the cavity 60 and extends above the top surface 52, as shown. The braze putty layer 64 is deposited over the superalloy putty layer 62 by known techniques. The component 50 is then placed in a vacuum furnace that sinters the superalloy putty and causes the braze putty to melt and infiltrate the superalloy putty in a sintering and hardening process.

Figure 5:
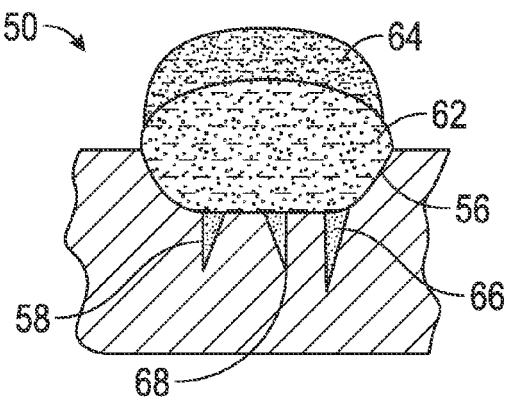
FIG. 5 is a cross-sectional view of the component shown in FIG. 2 where a loose superalloy powder has been deposited in the cracks and a superalloy putty layer and a braze putty layer have been deposited in the cavity on the powder.

FIG. 5 is the cross-sectional view of the component 50 shown in FIG. 2 where the cavity 56 has not been prepared for the two-layer superalloy putty/braze putty repair process. Prior to the superalloy putty layer 62 being deposited within the cavity 56, the cracks 58 are filled with a finely granulated loose superalloy powder 66 that fills the small gaps of the cracks 58 all the way to the points 68 with the superalloy material that was generally not possible when the superalloy material was in the putty form. Now that the cracks 58 are filled with the superalloy material in the form of the powder, the superalloy putty layer 62 and the braze putty layer 64 are deposited within the cavity 56 in the known manner. Thus, the integrity of the component 50 is maintained because material from the body 54 is not removed and the entire volume of the cavity 56 and the cracks 58 is filled with the superalloy material. The component 50 is then placed in a vacuum furnace (not shown) where the superalloy powder 66 and the superalloy putty layer 62 are sintered to form a solid superalloy sponge. The sponge 62 and 66 can significantly enhance the capillary effect to promote braze infiltration of the entire repair site. As mentioned, the braze alloy layer 64 is melted in the vacuum furnace to cause the braze alloy to infiltrate the superalloy sponge and trigger superalloy sponge consolidation, where the superalloy sponge consolidation includes diffusion of the braze alloy to harden and homogenize the superalloy sponge.

Figure 6:
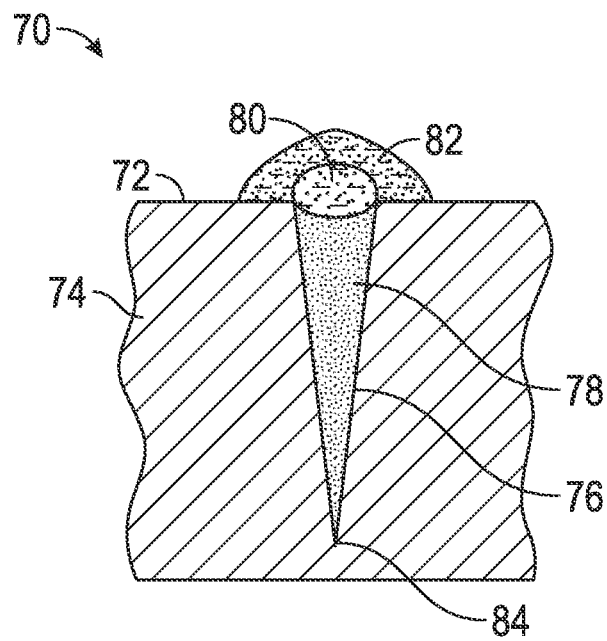
FIG. 6 is a cut-away, cross-sectional view of a high temperature superalloy component including a large crack filled with a loose superalloy powder and covered by a superalloy putty layer and a braze putty layer.

FIG. 6 is a cut-away, cross-sectional view of a portion of a high temperature superalloy component 70 having a top surface 72 and a body 74, and is the same or a similar type of component as the component 50 In this illustration, a large and deep crack 76 having a point 84 has formed in the body 74. As above, the crack 76 is filled, or at least partially filled, with a finely granulated superalloy loose powder 78 so that the crack 76 is completely filled with the superalloy material which may not have been possible if only the superalloy putty was employed. The superalloy powder 78 provided in the crack 76 not only serves as part of the repair filler, but also significantly enhance the capillary action for the braze filling as the crack is too large for traditional TLP repair to work. The crack 76 is filled with the superalloy powder 78 up to some predetermined level, and then a superalloy putty layer 80 is deposited on top of the powder 78 so that it extends above the surface 72, as shown. A braze putty layer 82 is then deposited on top of the superalloy putty layer 80 by known techniques.

Figure 7:
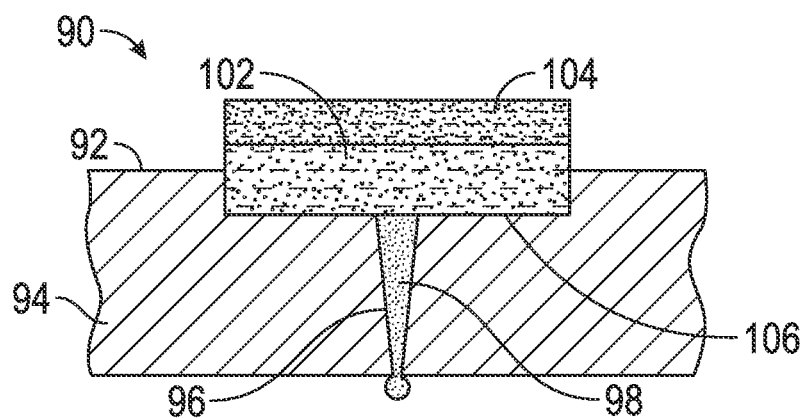
FIG. 7 is a cut-away, cross-sectional type view of a high temperature superalloy component including a through crack filled with a superalloy slurry covered by a superalloy putty layer and a braze putty layer.

Sometimes a crack will form all the way through the body of the component, which will not allow the finely granulated loose powder discussed herein to be deposited in the crack because it will completely fall through the crack. This is illustrated in FIG. 7 by a cut-away, cross-sectional view of a portion of a high temperature component 90 including a top surface 92 and a body 94. An erosion cavity 106 including a crack 96 has formed through the surface 92 into the body 94, where the crack 96 is formed completely through the body 94. Instead of providing a finely granulated superalloy powder within the crack 96, the present invention proposes depositing a superalloy slurry 98 in the crack 96 which is not a powder, but has a lower viscosity than the superalloy putty allowing it to flow into all areas of the crack 96 though a syringe, as shown. As above, once the crack 96 is filled with the slurry 98, a superalloy putty layer 102 is deposited on the slurry 98 by known techniques, and then a braze alloy layer 104 is deposited on the superalloy putty layer 102.

The above described embodiments in FIGS. 5-7 show the entire crack being filled with the superalloy powder or the superalloy slurry. However, it is noted that in alternate embodiments, only enough of the crack needs to be filled with the superalloy powder or the superalloy slurry where the remaining portion of the crack void will be determined to be large enough to allow that part of the crack to be effectively filled with the superalloy putty.

The foregoing discussion discloses and describes merely exemplary embodiments of the present invention. One skilled in the art will readily recognize from such discussion, and from the accompanying drawings and claims, that various changes, modifications and variations can be made therein without departing from the scope of the invention as defined in the following claims.

What is claimed is:

1. A method for repairing a defect in a component, said defect including a crack having a top portion that is wide enough to accept a superalloy putty and a bottom portion that is not wide enough to accept the superalloy putty, said method comprising:
   depositing a granulated loose superalloy powder with a maximum powder size that is smaller than the crack, including the bottom portion of the crack, or a superalloy slurry that is a combination of the granulated loose superalloy powder and an organic binder in the crack;
   depositing a superalloy putty layer on top of the superalloy loose powder or the superalloy slurry so that the superalloy putty layer extends above a top surface of the component;
   depositing a braze putty layer on top of the superalloy putty layer; and
   sintering the superalloy powder or the superalloy slurry and the superalloy putty to harden.

2. The method according to claim 1 further comprising providing mechanical vibration to cause the superalloy powder to further fill the crack.

3. The method according to claim 1 wherein depositing the granulated loose superalloy powder or the superalloy slurry includes depositing the granulated loose superalloy powder or the superalloy slurry to a level within the crack that fills the bottom portion that is not wide enough to accept the superalloy putty, but does not fill the top portion of the crack that is wide enough to accept the superalloy putty.

4. The method according to claim 1 wherein depositing the granulated loose superalloy powder or the superalloy slurry includes depositing the granulated loose superalloy powder or the superalloy slurry so that it completely fills the crack.

5. The method according to claim 1 wherein depositing the granulated loose superalloy powder or the superalloy slurry includes depositing the granulated loose superalloy powder if the crack does not extend completely through the component and depositing the superalloy slurry if the crack does extend completely through the component.

6. The method according to claim 1 wherein the superalloy putty is a mixture of a superalloy powder and an organic binder with higher viscosity than the granulated loose superalloy powder or the superalloy slurry, and wherein depositing the loose granulated superalloy powder or the superalloy slurry includes depositing a superalloy powder or a superalloy slurry including a different superalloy than the superalloy in the superalloy putty.

7. The method according to claim 1 wherein the superalloy putty is a mixture of a superalloy powder and an organic binder, and wherein depositing the granulated loose superalloy powder or the superalloy slurry includes depositing a superalloy powder or a superalloy slurry including the same superalloy as the superalloy in the superalloy putty.

8. The method according to claim 1 wherein the defect includes a combined erosion cavity with thermal fatigue cracking where the crack extends from a bottom of the erosion cavity.

9. The method according to claim 1 wherein depositing a superalloy putty layer includes depositing the superalloy putty layer within an erosion cavity or on an opening site of the crack of the defect.

10. The method according to claim 1 wherein the defect includes large deep thermal fatigue cracks with a crack opening gap larger than 0.2 mm.

11. The method according to claim 1 wherein the superalloy in the superalloy powder, the superalloy slurry and the superalloy putty are selected from the group consisting of a cast grade nickel, cobalt superalloys, IN738, MM247, Rene 80, Rene 142, IN100, IN939, X40, Alloy 713, Alloy 731, Rene 125, Rene 41 and MM509.

12. The method according to claim 1 wherein the braze putty includes a pure braze putty or a braze-superalloy mixture putty with a braze/superalloy mixing ratio range equal or higher than 70/30.

13. The method according to claim 1 wherein the component is a vane in a gas turbine engine.

14. A method for repairing damage to a vane in a gas turbine engine, said damage including a cavity having a top portion that is wide enough to accept a superalloy putty and a bottom portion that is not wide enough to accept a superalloy putty, said method comprising:
   depositing a granulated superalloy powder in the damage so that it at least partially fills the bottom portion of the damage;
   depositing a superalloy putty layer on top of the superalloy powder to fill the top portion of the damage; and
   depositing a braze putty layer on top of the superalloy putty layer.

15. The method according to claim 14 further comprising providing mechanical vibration to cause the superalloy powder to further fill the damage.

16. The method according to claim 14 wherein depositing the granulated superalloy powder includes depositing a superalloy powder to a level within the damage that fills the bottom portion, but does not fill the top portion of the damage.

17. The method according to claim 14 wherein depositing the granulated superalloy powder includes depositing the granulated superalloy powder so that it completely fills the damage.

18. The method according to claim 14 wherein the superalloy putty is a mixture of a superalloy powder and an organic binder, and wherein depositing the granulated superalloy powder includes depositing a superalloy powder including a different superalloy than the superalloy in the superalloy putty.

19. The method according to claim 14 wherein the superalloy putty is a mixture of a superalloy powder and an organic binder, and wherein depositing the granulated superalloy powder includes depositing a superalloy powder including the same superalloy as the superalloy in the superalloy putty.

20. The method according to claim 14 wherein the damage includes an erosion cavity and a crack that extends from a bottom of the erosion cavity.

21. The method according to claim 20 wherein depositing a superalloy putty layer includes depositing the superalloy putty layer within the erosion cavity.

22. A method for repairing a crack in a vane in a gas turbine engine, said crack including a cavity having a wide top portion that is wide enough to accept a superalloy putty and a narrow bottom portion that is not wide enough to accept the superalloy putty, said method comprising:
 depositing a superalloy powder slurry in the crack so that the superalloy powder slurry at least partially fills the narrow bottom portion of the crack;
 depositing a superalloy putty layer on top of the superalloy powder slurry to fill the wide top portion of the crack where the superalloy putty has a higher viscosity than the superalloy powder slurry; and
 depositing a braze putty layer on top of the superalloy putty layer.

\* \* \* \* \*